(12) United States Patent
Boyd et al.

(10) Patent No.: US 7,293,899 B2
(45) Date of Patent: Nov. 13, 2007

(54) BACKLIGHTING TRANSMISSIVE DISPLAYS

(75) Inventors: Gary Timothy Boyd, Woodbury, MN (US); Leland Ray Whitney, St. Paul, MN (US); Richard A. Miller, Stillwater, MN (US); Keith Michael Kotchick, St. Paul, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 700 days.

(21) Appl. No.: 10/702,976

(22) Filed: Nov. 6, 2003

(65) Prior Publication Data

US 2004/0136172 A1   Jul. 15, 2004

Related U.S. Application Data

(62) Division of application No. 09/949,948, filed on Sep. 10, 2001, now Pat. No. 6,663,262.

(51) Int. Cl.
*F21V 7/00* (2006.01)

(52) U.S. Cl. .......................... 362/296; 362/19; 362/26; 362/97; 362/600

(58) Field of Classification Search ................ 362/296, 362/19, 26, 600, 307, 308, 328, 329, 332, 362/97; 349/73, 77, 62, 114, 67; 313/110; 428/316.6
See application file for complete search history.

(56) References Cited

U.S. PATENT DOCUMENTS

| | | | |
|---|---|---|---|
| 4,874,228 A | | 10/1989 | Aho |
| 4,915,479 A | * | 4/1990 | Clarke .......................... 349/62 |
| 4,971,425 A | * | 11/1990 | Okabayashi et al. .......... 349/58 |
| 5,190,370 A | | 3/1993 | Miller |
| 5,283,563 A | | 2/1994 | Allen |
| 5,387,921 A | * | 2/1995 | Zhang et al. ................ 345/102 |
| 5,390,276 A | | 2/1995 | Tai |
| 5,471,348 A | | 11/1995 | Miller |
| 5,664,862 A | | 9/1997 | Redmond et al. |
| 5,673,128 A | | 9/1997 | Ohta et al. |
| 5,856,855 A | | 1/1999 | Mol |
| 5,863,114 A | | 1/1999 | Nagatani |
| 5,931,576 A | | 8/1999 | Kreysar |
| 5,976,686 A | | 11/1999 | Kaytor |
| 6,005,649 A | | 12/1999 | Krusius |
| 6,043,591 A | | 3/2000 | Gleckman |
| 6,111,696 A | | 8/2000 | Allen |
| 6,164,789 A | | 12/2000 | Unger |
| 6,282,029 B1 | | 8/2001 | Ma |
| 6,285,426 B1 | | 9/2001 | Akins |

(Continued)

FOREIGN PATENT DOCUMENTS

JP         05-249459        * 9/1992

(Continued)

*Primary Examiner*—Sandra O'Shea
*Assistant Examiner*—Mark Tsidulko

(57) ABSTRACT

A backlight assembly for use in a transmissive display system is described. The backlight assembly includes a light source that illuminates a light chamber. A transmissive display is positioned adjacent the light chamber so that light that exits the chamber illuminates the transmissive display. The backlight assembly may include one or more specular reflectors and one or more other optical elements to ensure that the light that exits the light chamber has the desired spatial uniformity, polarization, color, and/or angular distribution.

13 Claims, 8 Drawing Sheets

U.S. PATENT DOCUMENTS

| | | |
|---|---|---|
| 6,447,133 B1 | 9/2002 | Eschke |
| 2001/0008436 A1 | 7/2001 | Gleckman |
| 2001/0019479 A1 | 9/2001 | Nakabayashi |
| 2001/0036546 A1 | 11/2001 | Kaytor |
| 2002/0149925 A1 | 10/2002 | Epstein |

FOREIGN PATENT DOCUMENTS

| | | |
|---|---|---|
| WO | WO97 14981 | 4/1997 |
| WO | WO98 33006 A | 7/1998 |
| WO | WO 01/71248 | 9/2001 |

* cited by examiner

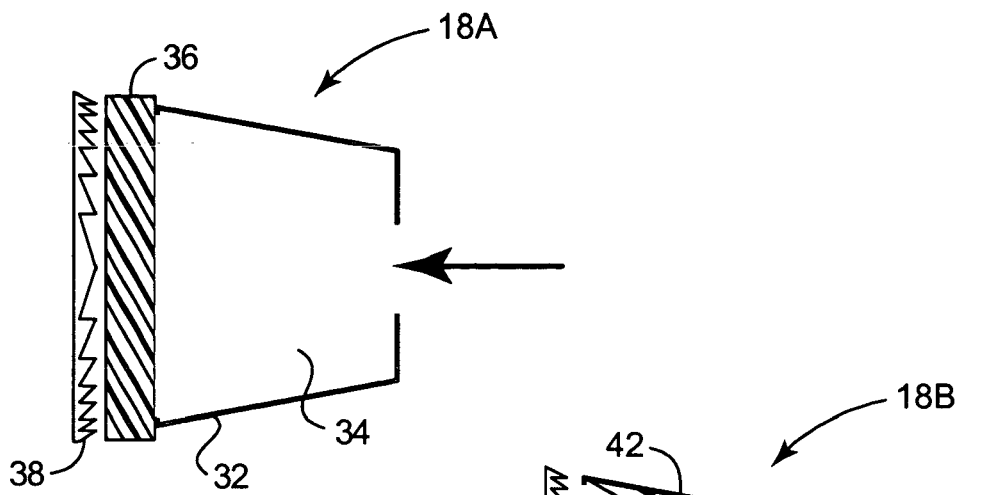
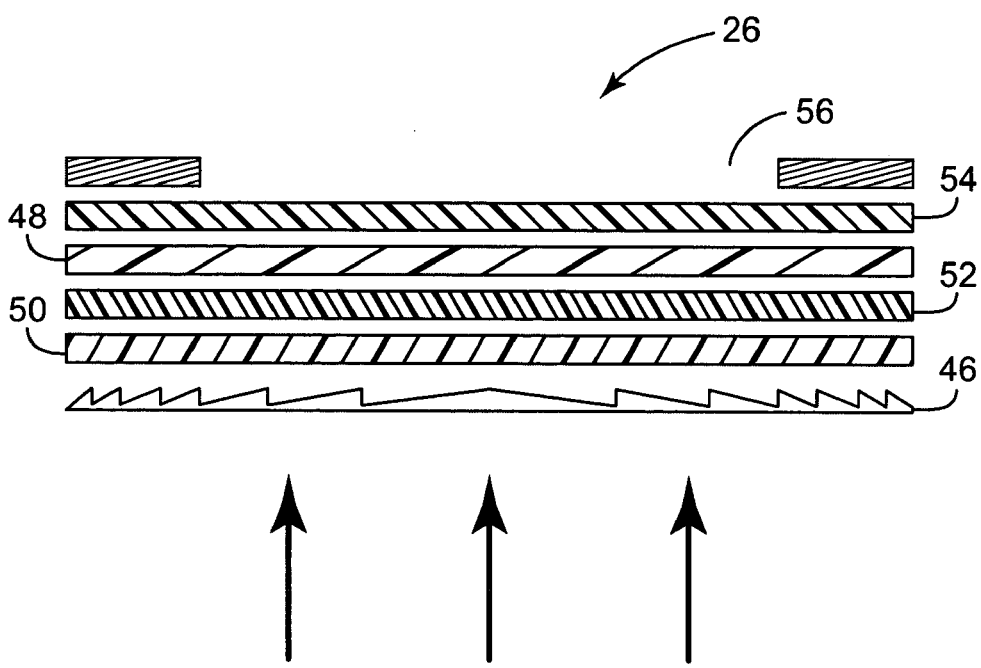

BACKLIGHTING TRANSMISSIVE DISPLAYS

This application is a divisional application of U.S. application Ser. No. 09/949,948, filed Sep. 10, 2001 now U.S. Pat. No. 6,663,262.

TECHNICAL FIELD

The invention relates to transmissive displays and more particularly to backlight assemblies for use with transmissive displays.

BACKGROUND

Transmissive display systems typically function by altering properties of transmitted light to produce visual representations of images. Conventional transmissive display systems typically include a light source that illuminates a transmissive display. The transmissive display receives input signals, for example, from a video board or a display driver. The input signals define the images that are to be displayed by the display system. The transmissive display alters the light from the light source as it passes through the transmissive display to produce visual representations of the images defined by the input signals.

Light from the light source, i.e., a backlight, typically requires conditioning prior to illuminating the transmissive display. For example, the transmissive display may require light to be spatially uniform in brightness and/or color. In addition, some transmissive displays require light to be polarized. Various conventional backlight assembly arrangements have been developed for the purpose of providing adequate lighting to a transmissive display. By improving backlight assemblies, the appearance of visual representations generated by transmissive display systems can also be improved.

SUMMARY

In general, the invention is directed toward a backlight assembly for use in a transmissive display system. The transmissive display system includes a transmissive display, such as a liquid crystal display ("LCD"), that is illuminated by the backlight assembly. The backlight assembly includes a light source that illuminates a light chamber. The transmissive display is positioned adjacent the light chamber so that light exiting the chamber illuminates the transmissive display. The backlight assembly may include one or more reflectors and one or more other optical elements to ensure that the light exiting the light chamber is adequately conditioned and sufficiently uniform in intensity. In other words, the optical elements are used to condition the light so that light exiting the backlight assembly has the desired illumination properties including, for example, the desired spatial uniformity, polarization, color, and angular distribution. In this manner, the backlight assembly can provide adequate lighting to a transmissive display so that the transmissive display can accurately render visual representations of images.

Additional details of various embodiments are set forth in the accompanying drawings and the description below. Other features, objects and advantages will become apparent from the description and drawings, and from the claims.

BRIEF DESCRIPTION OF THE DRAWINGS

FIGS. 2 and 3 are cross-sectional side views of exemplary embodiments of a first conditioner according to the invention.

FIG. 4 is a cross-sectional side view of an exemplary second conditioner according to the invention.

DETAILED DESCRIPTION

Figure 1:
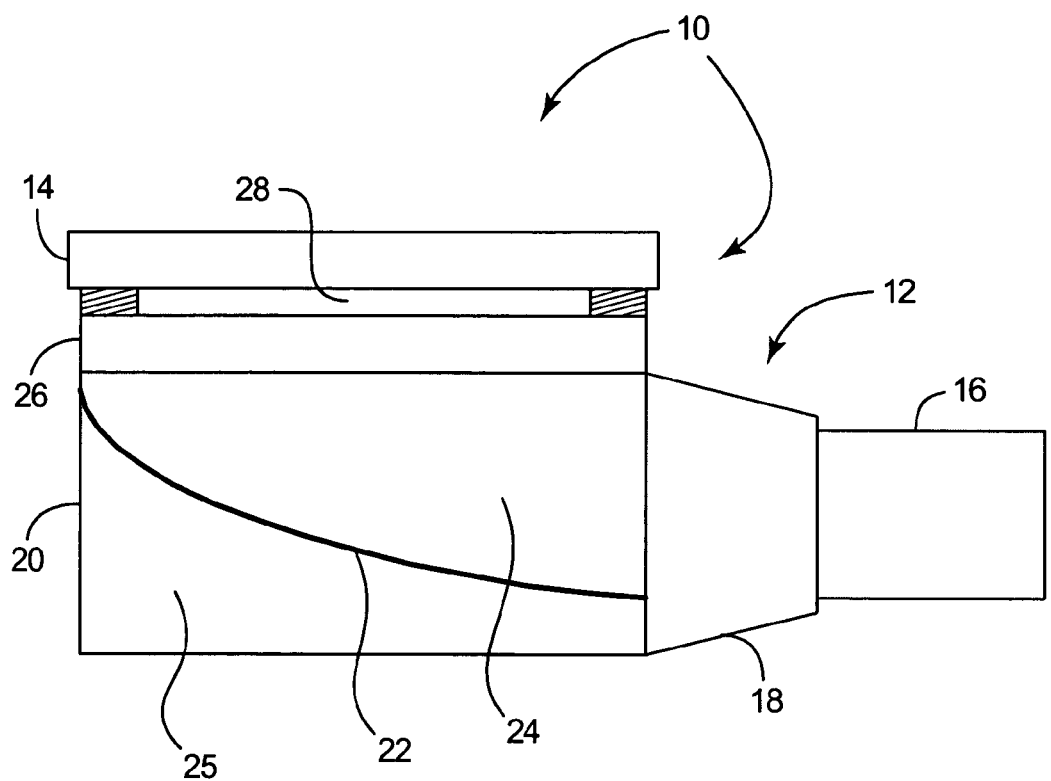
FIG. 1 is a cross-sectional side view of a transmissive display system according to the invention.

FIG. 1 is a cross-sectional side view of a transmissive display system 10 according to the invention. System 10 includes a backlight assembly 12 and a transmissive display 14. Transmissive display 14, for example, may be coupled to a video board (not shown) to receive input signals that define images to be displayed. Backlight assembly 12 provides light that transmissive display 14 alters according to the input signals to produce visual representations of the images. For example, transmissive display 14 may be a light valve such as a liquid crystal display ("LCD"), or any other transmissive display that requires illumination from a light source.

Backlight assembly 12 includes a light source 16 that comprises, for example, one or more point-like light sources such as light emitting diodes ("LEDs"). Alternatively, light source 16 may comprise any light producing apparatus, including a florescent lamp or the like. Fluorescent lamps, however, are relatively bulky and electrically noisy, and can use significant amounts of energy. For this reason, semiconductor light sources such as LEDs are generally preferred. In comparison, semiconductor light sources require a relatively small amount of energy and can be used in place of other light sources to significantly reduce the size of backlight assembly 12. By way of example, light source 16 may comprise a three color LED such as model NSCM310, available from Nichia Corporation of Japan, or a white LED such as model NSCW100, also available from Nichia Corporation of Japan. In some embodiments, light source 16 represents a number of LEDs that collectively produce the desired light.

Backlight assembly 12 may also include a first conditioner 18, i.e. a pre-conditioner. For example, first conditioner 18 may alter the polarization, spatial uniformity, angular distribution, and/or the color of the light emitted from light source 16. In this manner, the light emitted from light source 16 can be adapted for use in illumination of transmissive display 14. Several particularly effective embodiments of first conditioner 18 are described in greater detail below.

Light that passes through the first conditioner 18 enters light chamber 20. Reflector 22 resides within light chamber 20 to reflect the light that was conditioned by first conditioner 18. Light chamber 20 may be hollow (except for reflector 22) or may be filled with a filler material such as solid glass or plastic. For example, filler material could be used to condition light in lieu of conditioner 18. One or more of the walls of light chamber 20 may be reflective.

Light that reflects off reflector 22 is directed towards second conditioner 26, i.e., a post conditioner. Specific embodiments of second conditioner 26 are outlined in greater detail below. Briefly, the second conditioner 26 further conditions the light just before it is used to illuminate transmissive display 14. The second conditioner may also filter or reflect undesirable light. An aperture 28 may be formed around the outer surface of second conditioner 26. Light that is conditioned by second conditioner 26 can then pass through aperture 28 to illuminate transmissive display 14.

Reflector 22 can be viewed as dividing light chamber 20 into an inner portion 24 and an outer portion 25. The inner and outer portions 24 and 25 may be hollow, or one or both portions 24 and 25 may include filler material. For example, in one embodiment, reflector 22 is only partially reflective. In that case, light that passes through reflector 22 may reflect off the walls of outer portion 25 or off of a diffusant filler material within outer portion 25 before re-entering inner portion 24 through reflector 22. In this manner, light can be diffused and recycled within light chamber 20 until it is conditioned for use as an effective illuminator of transmissive display 14.

Reflector 22 may include a highly or partially reflecting coating deposited onto shaped surfaces that define the inner or outer portions 24, 25 of light chamber 20. Alternatively, reflector 22 may comprise a reflective film made by coating a suitable film substrate. Reflector 22 may also comprise a polymer multi-layer optical film ("MOF") having high reflectivity or partial reflectivity in the spectral range desired. For example, reflector 22 may be a reflective MOF that reflects over the entire visible wavelength range of 400 nm to 700 nm while transmitting infrared light, or a colored-mirror MOF that reflects a narrower spectral range as desired. In either case, the reflective MOF can provide advantages to the transmissive display system 10 by reflecting only the light having desirable wavelengths towards the transmissive display 14.

Reflector 22 can also be a polymer MOF reflective polarizer that reflects light having substantially one type of polarization. For example, it may reflect light having a first linear polarization and transmit light having orthogonal linear polarization, or it may reflect light having a first circularly polarization and transmit light having the opposite circular polarization. An example of a linear reflector polarizer is Dual Brightness Enhancing Film ("DBEF") available from Minnesota Mining and Manufacturing Company of Saint Paul, Minn. An example of a reflective circular polarizer is a cholesteric film, such as Nipocs™ film available from Nitto-Denko of Japan. Polarized reflective films can be used, for example, to polarize the light that enters light chamber 20, or to augment other polarizers used in backlight assembly 12. This can enhance the effectiveness of display system 10 if transmissive display 14 is a display that requires polarized light.

Reflector 22 can be a specular reflector such as a smooth specular reflective film. The specular reflective film can serve to reverse circular polarization of light upon reflection, or reflector 22 may be a quarter-wave mirror that serves to rotate linear polarization. Such polarization reversals upon reflection can be useful in polarization recycling schemes that utilize reflective polarizers, like some embodiments described below. Specular reflective films provide improved light control compared to patterned reflective surfaces or molded plastic chambers often used in conventional backlight assemblies. In addition, specular reflective films are generally more efficient at directing light than patterned reflective surfaces or molded plastic chambers.

The surface texture of reflector 22 is generally smooth to improve spatial uniformity of the illumination of transmissive display 14. The shape of reflector 22 may be used to maximize the brightness of the final backlight output. For example, reflector 22 may be curved in such a way as to focus light from first conditioner 12 to second conditioner 26. Alternatively or additionally, reflector 22 may improve uniformity of the final backlight output. The curvature can be made parabolic or dome shaped. For example, a specular reflective film may be parabolically curved along the surface of inner portion 24 or outer portion 25 if one or both of the portions are filled with a filler material.

Reflector 22 can also be pre-formed, for example, prior to insertion in light chamber 20. An injection molding process, a cast and cure process, or a combination of an injection molding process and a cast and cure process could be used to form reflector 22. In either case, reflector 22 may comprise a reflective coating on an appropriately shaped plastic surface, or may comprise a thermoformed mirror film. The creation of reflector 22 can be simplified if reflector 22 does not require a patterned surface.

The transmissive display system 10 provides several advantages over conventional arrangements. In particular, the light chamber design allows backlight assembly 12 to have a relatively compact size. If desired, the use of light guides and/or bulky fluorescent lamps can be avoided. Moreover, reflector 22 may be a specular reflector to provide advantages of efficiency and control over conventional patterned reflectors or non-specular molded plastic chambers. In addition, first conditioner 18 and second conditioner 26 can be fabricated prior to assembly of the backlight assembly 12 to further reduce manufacturing costs. Importantly, the backlight assembly 12 can effectively condition light for use in illumination of transmissive display 14. Light that is not properly conditioned may be filtered or possibly recycled in light chamber 20 to more efficiently utilize light source 16.

FIGS. 2-3 are cross-sectional side views of exemplary embodiments of a first conditioner 18. As shown in FIG. 2, housing 32 of first conditioner 18A forms a cavity 34. Cavity 34 may have a horn-shaped configuration, wherein the cross-sectional diameter of cavity 34 becomes larger in the direction that light propagates. Cavity 34 is formed with a hole, through which light can enter from a light source (as indicated by the arrow). The inner side walls of cavity 34 may be reflective so that light entering the cavity at large angles can reflect or scatter off the inner side walls to propagate through first conditioner 18A. A diffuser film 36 may reside on the larger side of cavity 34. Diffuser film 36 diffuses incoming light so that the light that exits first conditioner 18A is more spatially uniform in intensity. In other words, light that enters cavity 34 may come from one or more point sources, and therefore light directed toward diffuser film 36 may be much more intense at particular locations on an entrance face of diffuser film 36. Light that exits diffuser film 36, however, may be more spatially uniform in intensity over the exit surface of diffuser film 36. This, in turn, can improve spatial uniformity of light that ultimately illuminates transmissive display 14 (FIG. 1).

Diffuser film 36 may comprise a surface diffuser or a diffusive coating on a carrier film. Alternatively, a bulk diffuser without a substrate could be used to realize diffuser film 36. In another example, a thin section of white molded plastic could be used. The combination of cavity 24 and diffuser film 36 can serve to direct light out of first conditioner 18A such that the light is substantially uniform intensity over the surface area of the diffuser film 36. By way of example, a suitable diffuser film could be created by roughening the surface of an otherwise clear film. Alternatively, a coating including a resin and scattering particles could be applied to a clear film and then cured to realize a suitable diffuser film.

In some embodiments, a Fresnel lens 38 can be positioned adjacent to diffuser film 36. Fresnel lens 38 provides a relatively compact way to reduce the angular distribution of light entering the light chamber 20 (FIG. 1). Fresnel lens 38 may comprise a separate piece of molded plastic, or may form a molded portion of an edge of light chamber 20. Alternatively, Fresnel lens 38 may form a molded portion of an edge of first conditioner 18A. Fresnel lens 38 may have a linear, circular, or elliptical groove structure. In any case, the presence of Fresnel lens 38 can ultimately improve the illumination effect on transmissive display 14. As an alternative to Fresnel lens 38, a holographic optical element ("HOE") could. be used.

FIG. 3 illustrates another embodiment of a first conditioner 18. In FIG. 3, first conditioner 18B includes a cavity that is filled with diffuser material 42. Diffuser material diffuses incoming light so that the light that exits first conditioner 18B is more uniform in intensity. A suitable diffuser material could be created, for example, by combining a resin with scattering particles and injecting the mixture into the cavity of first conditioner 18B. The mixture can then be cured. Examples of scattering particles include titanium dioxide or transparent materials having an index of refraction different from that of the cured resin.

Filling the cavity with diffuser material may improve the diffusion of light compared to the embodiment in FIG. 2. However, filling the cavity with diffuser material can be more difficult and costly than using a diffuser film. In some embodiments, the cavity can be filled with diffuser material and a diffuser film can be used as well. Again, Fresnel lens 38 may also be used to reduce the angular distribution of light entering the light chamber 20 (FIG. 1). A polarizer film (not shown) could also be used to properly polarize the light entering light chamber 20. An example of a suitable polarizer film is HLC25618S film available from Sanritz of Japan.

In still other embodiments, first conditioner 18 includes a film or coating that converts light having a first wavelength to light having a second wavelength. For example, light source 16 may emit ultra-violet ("UV") light. In that case, first conditioner 18 may include a film, coating or filler material including florescent materials that convert UV light to light within the visible spectrum.

FIG. 4 is a cross-sectional side view of one particular embodiment of a second conditioner 26. Second conditioner 26 may include a variety of films or molded optical components so that light that emerges from second conditioner 26 has the required spectral content, adequate light distribution and the required polarization state. For example, second conditioner 26 may include Fresnel lens 46 to collimate incoming light (indicated by the arrows).

Second conditioner 26 may also include a reflective polarizer 48. Reflective polarizer 48 may act as a brightness enhancing component by reflecting light of undesired polarization back into the light chamber for recycling. In other words, reflective polarizer 48 may only allow light that is polarized correctly to pass through. Light having undesired polarization is reflected. The light reflected from the reflective polarizer 48 may reenter the light chamber, possibly becoming polarized correctly and then later passed through reflective polarizer 48. In this manner, light from the light source 16 can be used more efficiently. An example of a suitable reflective polarizer is DBEF, available from Minnesota Mining and Manufacturing Company of Saint Paul, Minn.

Second conditioner 26 may also include one or more prismatic films 52 that serve to decrease the angular distribution of light exiting light chamber 20. For example, prismatic film 52 may redirect light exiting light chamber 20 at particular angles relative to the prismatic film 52. The light redirected by prismatic film 52 can also be recycled, eventually exiting light chamber 20 at an angle which will pass through prismatic film 52. For example, Brightness Enhancing Film ("BEF"), available from Minnesota Mining and Manufacturing Company of Saint Paul, Minn. could be used to realize prismatic film 52. Alternatively, prismatic film 52 may comprise TRAF, available from Minnesota Mining and Manufacturing Company of Saint Paul, Minn. TRAF redirects light coming in at high angles to exit at different angles.

In some embodiments, more than one prismatic film 52 could be positioned adjacent one another, but rotated 90 degrees relative to one another. In that case, the two prismatic films may collectively comprise what is referred to as a "crossed prismatic film."

Second conditioner 26 may also include a diffuser film 50 and a polarizer film 54. Diffuser film 50 can improve spatial uniformity of light. In addition, the diffuser film may be colored so as to filter undesired wavelengths of light. Alternatively, a separate color filter (not shown) could be used ensure the desired spectral output. Polarizer film 54 absorbs or reflects light having undesired polarization and transmits light of the desired polarization. An aperture 56 can also be added to block stray light that might degrade optical quality of the light exiting second conditioner 26. Examples of a suitable diffuser film and a suitable polarizer film are mentioned above.

The components of second conditioner 26 may be arranged in various orders. However, second conditioner 26 may operate most effectively when the components are arranged as illustrated in FIG. 4. For example, light may pass through Fresnel lens 46, then diffuser film 50, then prismatic film 52, then reflective polarizer 48, then polarizer 54 before finally passing through aperture 56.

Referring again to FIG. 1, additional features could also be included one or more of the various components to facilitate connections between the components. For example, second conditioner 26 may include a tapered frame and clips, or the like, for mating with a housing of transmissive display 14. Similarly, first conditioner 18 may include features to facilitate mating with light source 16. For example, mechanical elements could facilitate the mating, or alternatively, an adhesive or a bonding material could be used.

Figure 5:
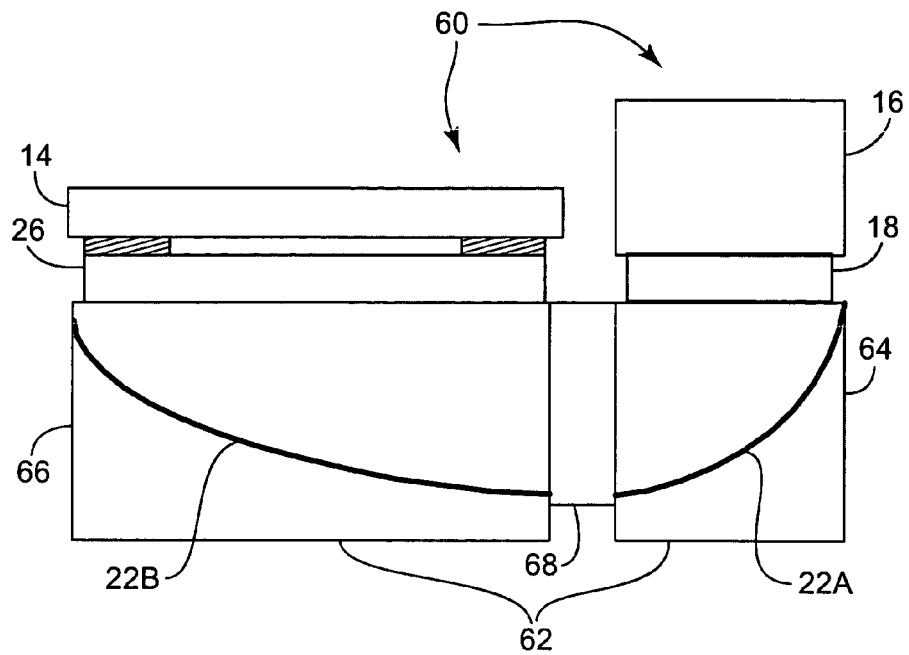
FIGS. 5 and 6 are cross sectional side views of additional embodiments of transmissive display systems according to the invention.

FIG. 5 is a cross-sectional side view of another embodiment of a transmissive display system 60 according to the invention. In this embodiment, a light chamber 62 includes two separate light chamber regions 64 and 66. An additional third conditioner 68 may be positioned between the two light chamber regions 64 and 66. This configuration allows light source 16 to be positioned on the same side of light chamber 62 as the second conditioner 26. In other words, in the transmissive display system 60, light source 16 is positioned along a common side with transmissive display 14. By positioning transmissive display 14 and the light source 16 along a common side of light chamber 62, transmissive display 14 and light source 16 can be directly coupled to a main circuit board without the need for additional flex circuits often used in conventional transmissive display systems. In other words, the light source 16 and transmissive display 14 could be directly coupled to the main circuit board. However, the main circuit board may need to be formed with a hole for viewing of transmissive display 16.

In operation, light from light source 16 is conditioned as it passes through first conditioner 18. The light then reflects off reflector 22A, which has a shape that causes light to reflect toward third conditioner 68. The light passes through third conditioner 68 and reflects off reflector 22B, which has a shape that causes light to reflect toward second conditioner 26. The light then passes through second conditioner 26 and illuminates transmissive display 14. Reflectors 22A and 22B may be similar to reflector 22 (FIG. 1) described above. Similarly, first conditioner 18 may be similar to that illustrated in FIG. 2 or 3, and second conditioner 26 may be similar to that illustrated in FIG. 4. Third conditioner 68 may include one or more optical elements such as a diffuser film or a polarizer film that further condition the light according to the desired characteristics. A suitable polarizer film and a suitable diffuser film are listed above.

In one embodiment related to FIG. 5, reflector 22A and reflector 22B include a single reflective film. In that case, the reflective film could be reflective polorizer or a mirror film formed to define both reflector 22A and reflector 22B.

Figure 6:
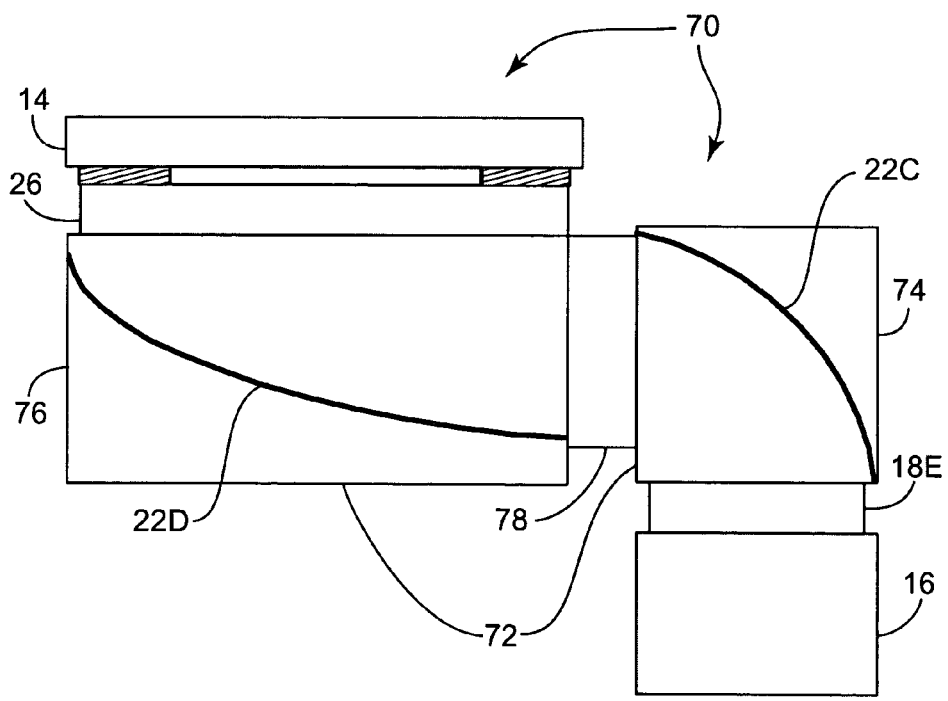

FIG. 6 is a cross-sectional side view of another embodiment of a transmissive display system 70 according to the invention. In this embodiment, a light chamber 72 again includes two separate light chamber regions 74 and 76, and an additional third conditioner 78 may be positioned between the two light chamber regions 74 and 76. This configuration allows light source 16 to be positioned on the opposite side of light chamber 72 in relation to the second conditioner 26. In other words, in the transmissive display system 70, light source 16 is positioned on the opposite side of light chamber 72 in relation to transmissive display 14. Positioning the transmissive display 14 and the light source 16 along opposing sides of light chamber 62 can provide advantages. For example, the need for additional flex circuits often used in conventional transmissive display systems to couple light source 16 to a main circuit board can be avoided. In contrast to conventional arrangements, the embodiment of FIG. 6 allows light source 16 to be coupled directly to the main circuit board. Only transmissive display 14 would require a flex circuit. As an advantage over the embodiment of FIG. 5, transmissive display 14 could be viewed without forming any additional holes on the circuit board.

In operation, light from light source 16 is conditioned as it passes through first conditioner 18. The light then reflects off reflector 22C which has a shape that causes light to reflect toward third conditioner 78. The light passes through third conditioner 78 and reflects off reflector 22D, which has a shape that causes light to reflect toward second conditioner 26. The light then passes through second conditioner 26 and illuminates transmissive display 14. Again, reflectors 22C and 22D may be similar to reflector 22 (FIG. 1) described above. Similarly, first conditioner 18 may be similar to that illustrated in FIG. 2 or 3, and second conditioner 26 may be similar to that illustrated in FIG. 4. Third conditioner 78 may include one or more optical components such as a diffuser film or a polarizer film that further condition the light according to the desired characteristics.

In one embodiment related to FIG. 6, reflector 22C and reflector 22D include a single reflective film. In that case, the reflective film would need to be a reflective polarizer. The single reflective film would also comprise an element of third conditioner 78. The reflective film could be formed to define both reflector 22C and reflector 22D, bending through third conditioner 78. The transmission axis of the reflective polarizer would preferably be 45 degrees relative to an edge of the chamber to ensure that light reflected off reflector 22C would pass through third conditioner 78.

Figure 7:
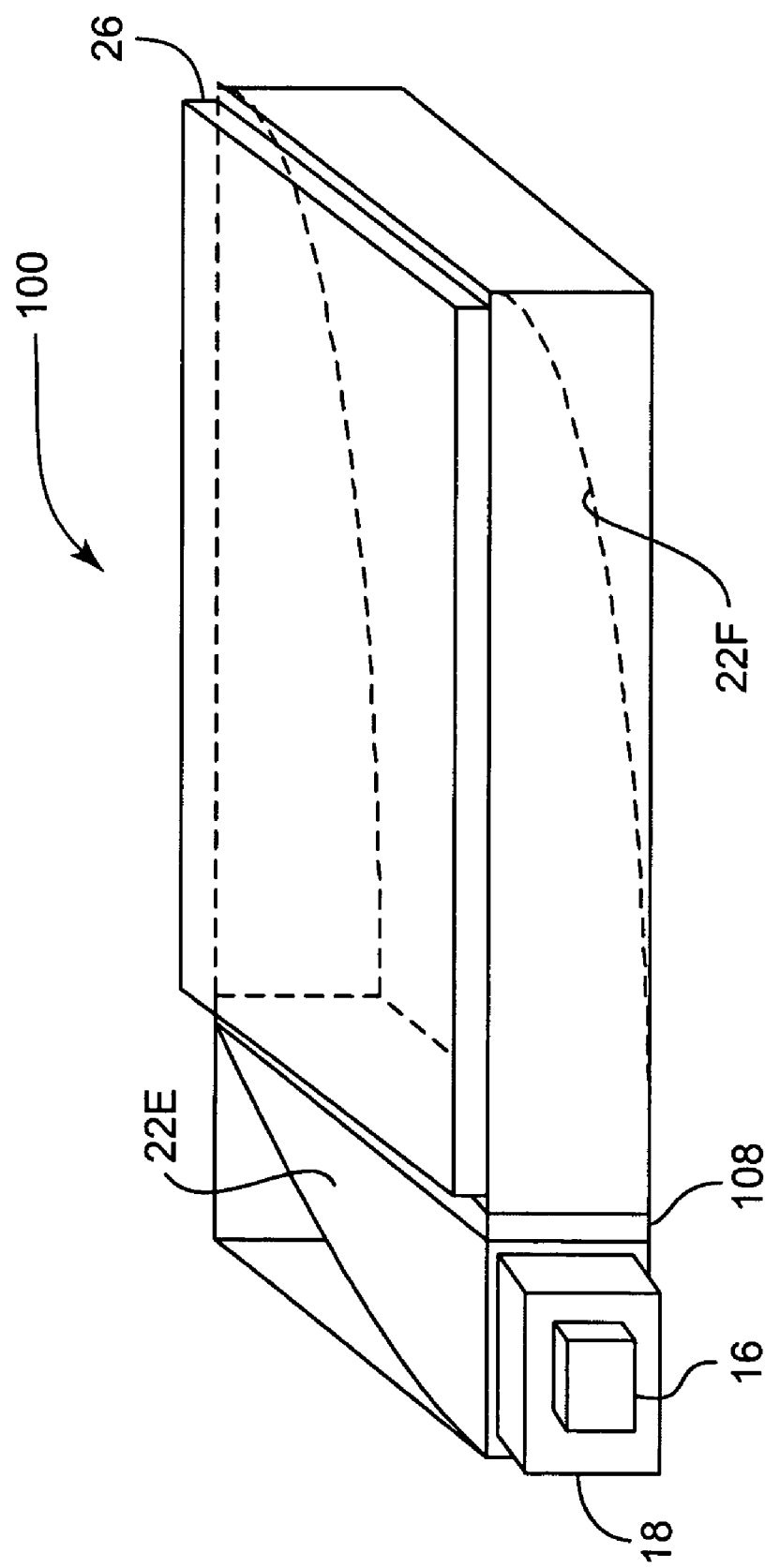
FIG. 7 is a perspective view of yet another embodiment of a backlight assembly 100 for use in a transmissive display system.

FIG. 7 is a perspective view of yet another embodiment of a backlight assembly 100 for use in a transmissive display system. As shown, backlight assembly 100 includes light source 16 that passes light through first conditioner 18. The light then reflects off reflector 22E which has a shape that causes light to reflect toward third conditioner 108. The light passes through third conditioner 108 and reflects off reflector 22F, which has a shape that causes light to reflect toward second conditioner 26. The light then passes through second conditioner 26. A transmissive display (not shown) can be positioned adjacent second conditioner 26 to be illuminated. The arrangement illustrated in FIG. 7 can provide space advantages for some compact display systems.

Figure 8:
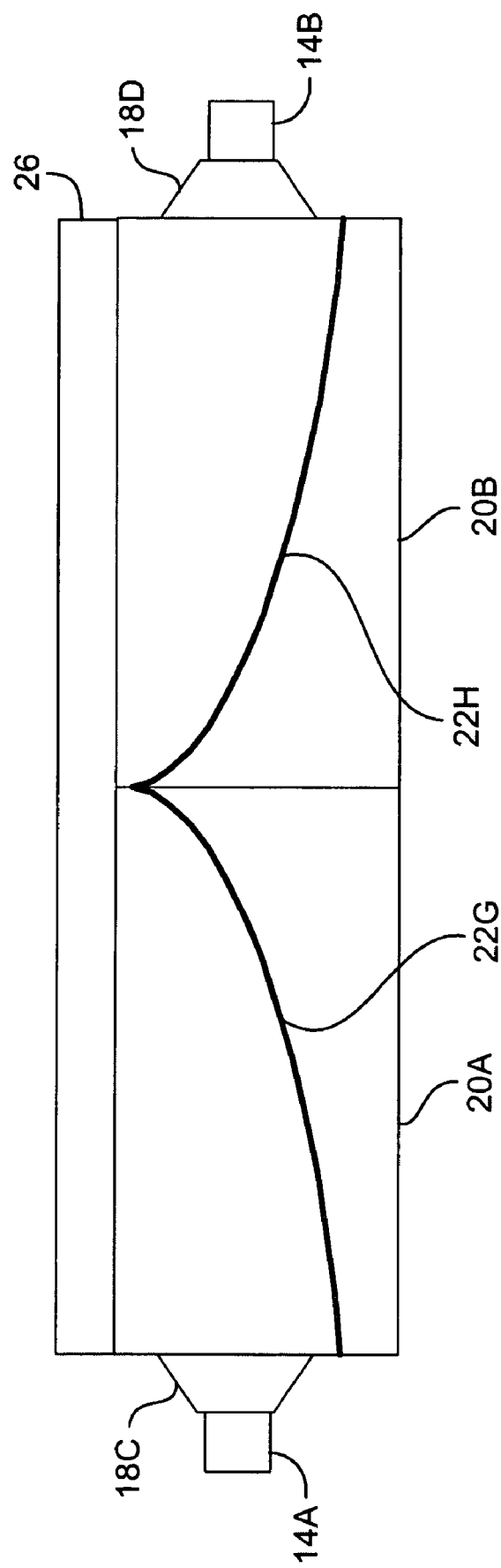
FIGS. 8 and 9 are cross-sectional side views of backlight assemblies that utilize more than one light chamber.
Figure 9:
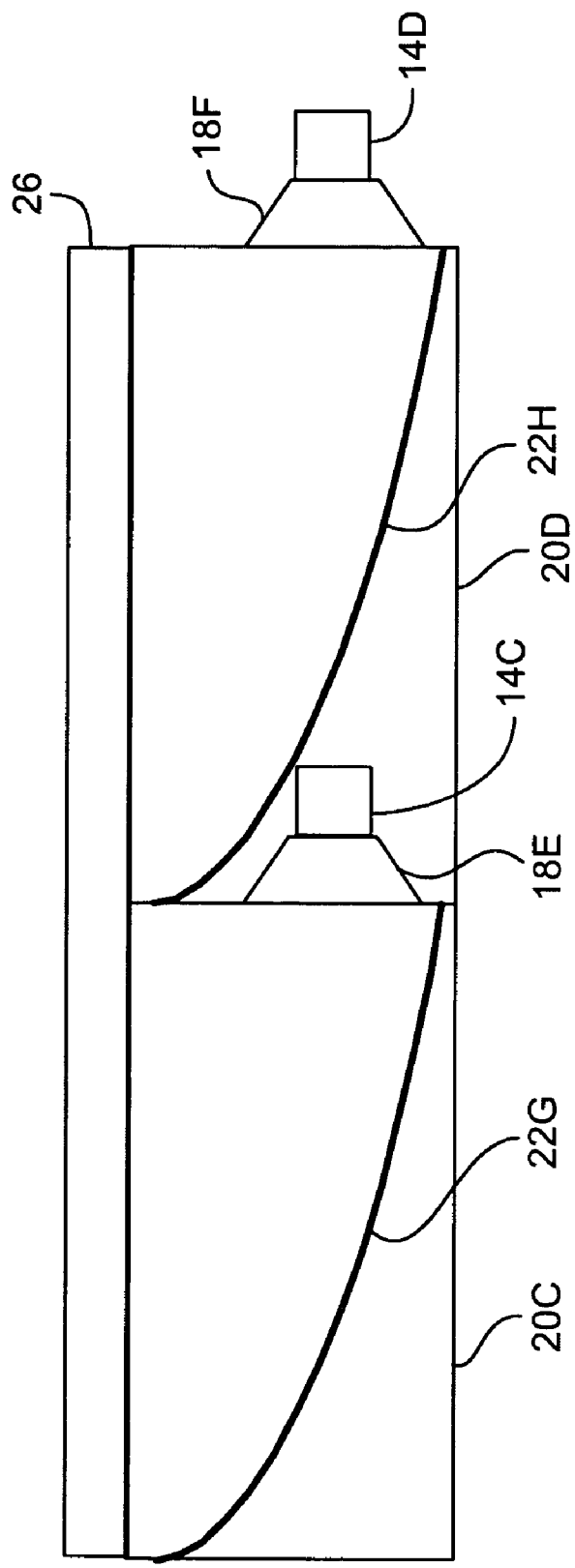

FIGS. 8 and 9 are cross-sectional side views of backlight assemblies that utilize more than one light chamber. These embodiments utilize the teaching above in combination to realize a backlighting system that has an increased lighting area for the transmissive display. For example, as shown in FIG. 8, light sources 14A and 14B may pass light respectively through first conditioners 18C and 18D into light chambers 20A and 20B. The light may then reflect of reflectors 22G and 22H before illuminating second conditioner 26. A transmissive display (not shown) can be positioned adjacent second conditioner 26 to be illuminated. Second conditioner 26 may further include a top diffuser film, i.e., an additional diffuser film comprising the outermost layer of second conditioner 26, to achieve uniform illumination along the joining line of light chambers 20A and 20B.

FIG. 9 illustrates another example. In FIG. 9 light sources 14C and 14D pass light respectively through first conditioners 18E and 18F into light chambers 20C and 20D. The light then reflects of reflectors 22G and 22H before illuminating second conditioner 26. Again, a transmissive display can be positioned adjacent second conditioner 26 to be illuminated, and second conditioner 26 may further include a top diffuser film to achieve uniform illumination along the joining line of light chambers 14C and 14D.

The embodiments in FIGS. 8 and 9 can provide the advantage of increasing the lighting area for the transmissive display. The use of relatively bulky components, however, can still be avoided, allowing the system to maintain a relatively compact form factor in relation to the size of the lighting area. Additional light sources and light chambers could be combined according to the invention to realize larger and larger lighting areas.

Figure 10:
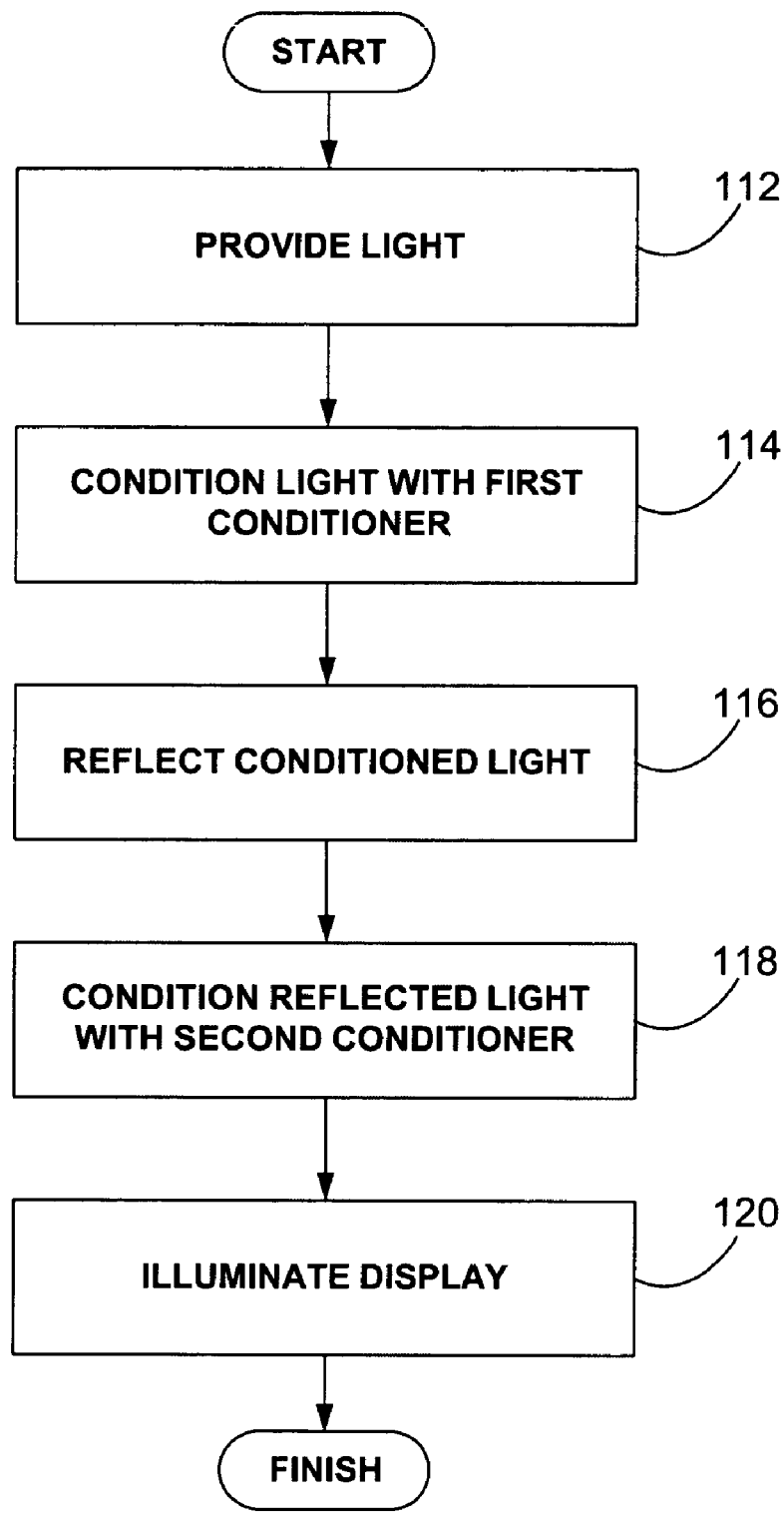
FIG. 10 is a flow diagram illustrating an example process of illuminating a display according to an embodiment of the invention.

FIG. 10 is a flow diagram illustrating a process of illuminating a display according to the invention. As shown, a light source provides light (112), which is then conditioned by a first conditioner (114). A second conditioner then reflects (116) and conditions the light (118). A display can then be effectively illuminated with the light (120). The first and second conditioners may substantially correspond to those described above. Similarly, the reflector may substantially correspond to one of the reflectors described above.

For example, the reflector could also be used to condition the light. An additional third conditioner and second reflector could also be used as shown in FIGS. 5 or 6.

Figure 11:
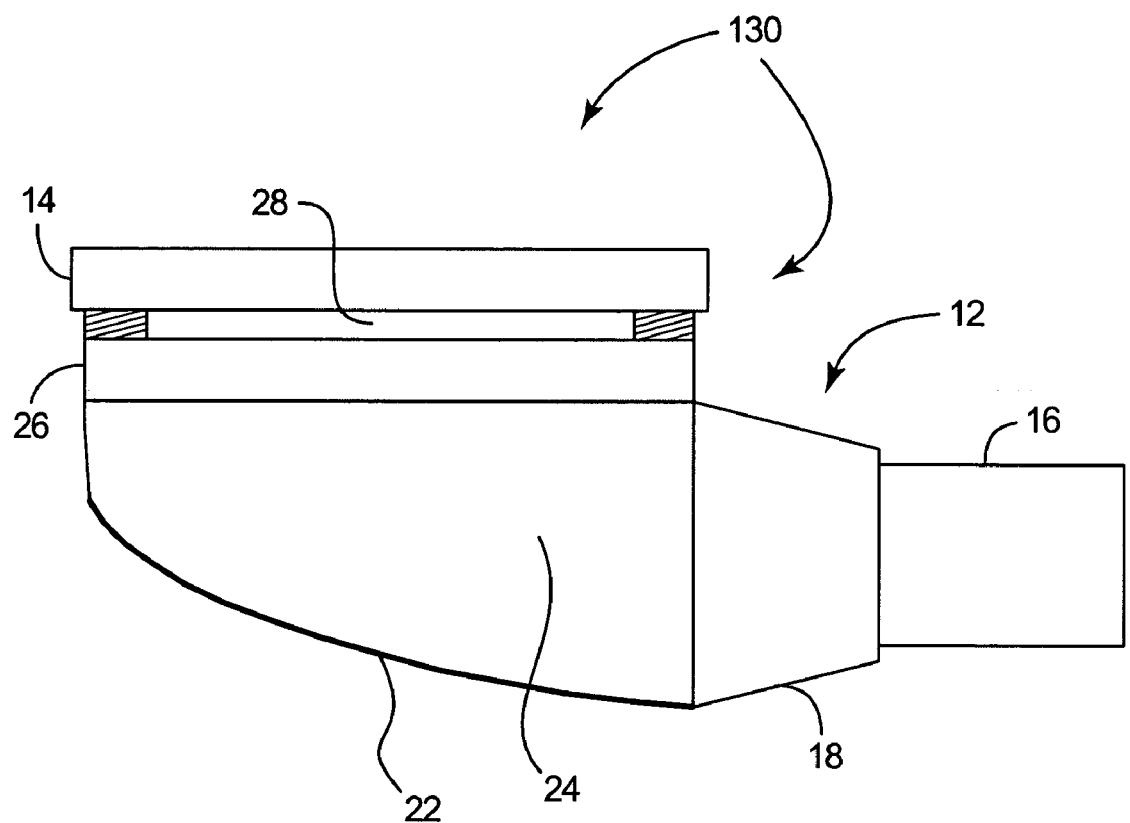
FIG. 11 is a cross-sectional side view of another transmissive display system according to the invention.

FIG. 11 is a cross-sectional side view of a transmissive display system 130 according to yet another embodiment of the invention. In particular, transmissive display system 130 is substantially similar to system 10 illustrated in FIG. 1. However, transmissive display system 130 eliminates the outer portion 25 (FIG. 1) of the light chamber. Instead, inner portion 24 comprises the light chamber without an outer portion.

The invention can provide several advantages. For example, the invention can be used to reduce the size of backlight assemblies. This is particularly advantageous for use with miniature displays, i.e., those having a diagonal dimension less than 3 centimeters. Such displays are often implemented in viewfinders for digital cameras and video cameras, or on head mounted video displays or the like. The invention achieves a relatively compact form factor by removing the need to use bulky conventional components.

For example, the light chamber configured according to the invention removes the need to use flat light guides that are typically illuminated by fluorescent lamps. Fluorescent lamps typically require a large amount of power and specialized high voltage drivers, which may introduce electrical noise. The invention, however, does not require these costly and bulky components. Instead, efficient "point-like" light sources, such as light emitting diodes, can be used instead of light guides and fluorescent lamps. Thus, the need for a fluorescent driver circuit is also eliminated.

The invention can utilize a smooth specular reflector within the light chamber to reflect light. Smooth specular reflectors can improve the efficiency of the backlighting system compared to patterned reflectors or non-specular molded plastic chambers. Moreover, smooth specular reflectors can provide better light control than patterned reflectors or non-specular molded plastic chambers.

The invention provides an efficient and effective assembly for distributing light from discrete point-like light sources to illuminate a transmissive display with the required spatial uniformity of brightness and color. Moreover, in some embodiments, the invention can remove the need for costly connectors, such as flex circuits, that connect the display to a main circuit board. By positioning the display and the light source along a common side of the light chamber, or on opposing sides of the light chamber, the display can be directly coupled to a main circuit board without the need for additional flex circuits. Another advantage relates to the cost of manufacturing and assembly, which can be significantly reduced by various aspects of the invention.

Various embodiments of the invention have been described. For instance, a backlight assembly has been described for use in a transmissive display system. Nevertheless, various modifications may be made without departing from the scope of the invention. Accordingly, other embodiments are within the scope of the following claims.

The invention claimed is:

1. A backlight assembly for a transmissive display device comprising:
    a light chamber divided into two chamber regions;
    a light source that emits light into the light chamber;
    a first conditioner disposed between the light source and the light chamber, wherein the first conditioner alters light entering the light chamber;
    a reflector within the light chamber that reflects light altered by the first conditioner;
    a second conditioner that alters light reflected by the reflector, wherein light exists the light chamber through the second conditioner; and
    a third conditioner separating the two chamber regions of the light chamber, wherein light passes from a first chamber region of the light chamber through the third conditioner and into a second chamber region of the light chamber.

2. The backlight assembly of claim 1, wherein the third conditioner includes a diffuser film.

3. The backlight assembly of claim 1, wherein the third conditioner includes a polarizer film.

4. The backlight assembly of claim 1, further comprising a second reflector, wherein the reflectors reside respectively within the two chamber regions.

5. The backlight assembly of claim 1, wherein the light source and the second conditioner are positioned on a same side of the chamber.

6. The backlight assembly of claim 1, wherein the light source and the second conditioner are positioned on opposing sides of the chamber.

7. A transmissive display system comprising:
    a light source;
    a light chamber; and
    a display, wherein the light source illuminates the light chamber and the light chamber illuminates the display, and wherein the light source and the display are positioned along a common side of the light chamber; and
    wherein the light chamber includes a first chamber region and a second chamber region, and wherein the light source is positioned adjacent the first chamber region and the display is positioned adjacent the second chamber region.

8. The transmissive display system of claim 7, wherein the light chamber includes at least one reflector that reflects light emitted from the light source toward the display.

9. The transmissive display system of claim 7, further comprising at least one conditioner that alters light emitted from the light source.

10. A backlight assembly for a transmissive display device comprising;
    a light chamber including first and second light chamber regions,
    a light source that emits light into the first light chamber region,
    a first conditioner that alters light that enters the first light chamber region,
    a first reflector within the first light chamber region that reflects light altered by the first conditioner,
    a third conditioner that alters light reflected by the first reflector, the third conditioner positioned between the first and second light chamber regions, wherein light passes from the first light chamber region of the light chamber through the third conditioner and into the second light chamber region of the light chamber,
    a second reflector within the second light chamber region that reflects light altered by the third conditioner, and
    a second conditioner that alters light reflected by the second reflector.

11. The backlight assembly of claim 10, wherein the first conditioner and the second conditioner are positioned on a common side of the light chamber.

12. The backlight assembly of claim 10, wherein the first conditioner and the second conditioner are positioned on opposing sides of the light chamber.

13. A backlight assembly for a transmissive display comprising:

a first light chamber,
a first light source that illuminates the first light chamber.
a second light chamber,
a second light source that illuminates the second light chamber, wherein a joining line is defined between the first and second light chambers, and
a diffuser film spanning across both the first and second light chambers such that substantially uniform illumination is achieved along the joining line of the first and second light chambers.

* * * * *

UNITED STATES PATENT AND TRADEMARK OFFICE
CERTIFICATE OF CORRECTION

PATENT NO. : 7,293,899 B2  Page 1 of 1
APPLICATION NO. : 10/702976
DATED : November 13, 2007
INVENTOR(S) : Gary T. Boyd It is certified that error appears in the above-identified patent and that said Letters Patent is hereby corrected as shown below:

Column 5
Line 24, delete "could." and insert -- could --, therefor.

Column 10
Line 41, in Claim 10, delete "comprising;" and insert -- comprising: --, therefor.

Column 11
Line 2, in Claim 13, delete "chamber." and insert -- chamber, --, therefor.

Signed and Sealed this

Eighteenth Day of March, 2008

JON W. DUDAS
*Director of the United States Patent and Trademark Office*